(12) United States Patent
Hermansky et al.

(10) Patent No.: US 7,254,538 B1
(45) Date of Patent: Aug. 7, 2007

(54) NONLINEAR MAPPING FOR FEATURE EXTRACTION IN AUTOMATIC SPEECH RECOGNITION

(75) Inventors: Hynek Hermansky, Martigny (CH); Sangita Sharma, Portland, OR (US); Daniel Ellis, New York, NY (US)

(73) Assignee: International Computer Science Institute, Berkely, CA (US)

( * ) Notice: Subject to any disclaimer, the term of this patent is extended or adjusted under 35 U.S.C. 154(b) by 1369 days.

(21) Appl. No.: 09/714,806

(22) Filed: Nov. 16, 2000

Related U.S. Application Data

(60) Provisional application No. 60/165,776, filed on Nov. 16, 1999.

(51) Int. Cl.
*G10L 15/14* (2006.01)

(52) U.S. Cl. .............. 704/256.1; 704/232; 704/240

(58) Field of Classification Search ........ 704/201–203, 704/232, 236–237, 240, 256, 256.1
See application file for complete search history.

(56) References Cited

U.S. PATENT DOCUMENTS 5,317,673 A * 5/1994 Cohen et al. ............... 704/232
5,745,649 A * 4/1998 Lubensky ................... 704/232

OTHER PUBLICATIONS

N. Morgan and H. Bourlard, Continuous Speech Recognition, An introduction to hybrid HMM/connectionist approach, IEEE Signal Processing Magazine, 12(3): 25-42, May 1995.

* cited by examiner

*Primary Examiner*—Angela Armstrong
(74) *Attorney, Agent, or Firm*—Fish & Richardson, P.C.

(57) ABSTRACT

The present invention successfully combines neural-net discriminative feature processing with Gaussian-mixture distribution modeling (GMM). By training one or more neural networks to generate subword probability posteriors, then using transformations of these estimates as the base features for a conventionally-trained Gaussian-mixture based system, substantial error rate reductions may be achieved. The present invention effectively has two acoustic models in tandem—first a neural net and then a GMM. By using a variety of combination schemes available for connectionist models, various systems based upon multiple features streams can be constructed with even greater error rate reductions.

20 Claims, 3 Drawing Sheets

NONLINEAR MAPPING FOR FEATURE EXTRACTION IN AUTOMATIC SPEECH RECOGNITION

CROSS REFERENCE TO RELATED APPLICATIONS

This application claims priority under 35 U.S.C. § 119(e) to U.S. provisional application No. 60/165,776, filed Nov. 16, 1999, entitled "Nonlinear Mapping for Feature Extraction in Automatic Recognition of Speech", which is incorporated by reference.

FIELD OF THE INVENTION

The invention relates to the field of automatic speech recognition.

BACKGROUND OF THE INVENTION

Current speech recognition systems generally have three main stages. First, the sound waveform is passed through feature extraction to generate relatively compact feature vectors at a frame rate of around 100 Hz. Second, these feature vectors are fed to an acoustic model that has been trained to associate particular vectors with particular speech units. Commonly, this is realized as a set of Gaussian mixtures models (GMMs) of the distributions of feature vectors corresponding to context-dependent phones. (A phone is a speech sound considered without reference to its status as a phoneme.) Finally, the output of these models provides the relative likelihoods for the different speech sounds needed for a hidden Markov model (HMM) decoder, which searches for the most likely allowable word sequence, possibly including linguistic constraints.

A hybrid connectionist-HMM framework replaces the GMM acoustic model with a neural network (NN), discriminatively trained to estimate the posterior probabilities of each subword class given the data. Hybrid systems give comparable performance to GMM-based systems for many corpora, and may be implemented with simpler systems and training procedures.

Because of the different probabilistic bases (likelihoods versus posteriors) and different representations for the acoustic models (means and variances of mixture components versus network weights), techniques developed for one domain may be difficult to transfer to the other. The relative dominance of likelihood-based systems has resulted in the availability of very sophisticated tools offering advanced, mature and integrated system parameter estimation procedures. On the other hand, discriminative acoustic model training and certain combination strategies facilitated by the posterior representation are much more easily implemented within the connectionist framework.

Hidden Markov model speech recognition systems typically use Gaussian mixture models to estimate the distributions of de-correlated acoustic feature vectors that correspond to individual sub-word units. By contrast, hybrid connectionist-HMM systems use discriminatively-trained neural networks to estimate the probability distribution among subword units given the acoustic observations.

SUMMARY OF THE INVENTION

The present invention can achieve significant improvement in word recognition performance by combining neural-net discriminative feature processing with Gaussian-mixture distribution modeling (GMM). By training the neural network to generate the subword probability posteriors, then using transformations of these estimates as the base features for a conventionally-trained Gaussian-mixture based system, substantial error rate reductions may be achieved. The present invention effectively has two acoustic models in tandem—first a neural net and then a GMM. This performs significantly better than either the hybrid or conventional systems alone, achieving thirty-five percent or better relative error rate reduction under some test conditions. By using a variety of combination schemes available for connectionist models, various systems based upon multiple features streams can be constructed with even greater error rate reductions.

In one aspect, the present invention transforms the output of one or more neural networks that are trained to derive subword (phone) posterior probabilities from an input audio stream. These are transformed by transforming the skewed distribution into a more Gaussian distribution by warping the posterior probabilities into a different domain. In one implementation, such warping includes taking the logarithm of the posterior probabilities. In another implementation, such warping includes omitting the output layer of the neural network trained using softmax nonlinearity. In one implementation, the neural networks are multilayer perceptrons. The input audio stream can be divided into critical bands, and further it can be divided temporally to provide syllable-length temporal vectors of logarithmic energies in the input audio stream. The transformed distribution can be de-correlated, such as by application of a Karhunen-Loeve projection.

One implementation of the present invention is a computer program that performs the steps of transforming the distribution of subword posterior probabilities estimated by one or more neural networks from an input audio stream, de-correlating the transformed distribution of posterior probabilities, and supplying the de-correlated and transformed posterior probabilities to a Gaussian mixture distribution model automatic speech recognition system.

In another aspect, the invention combines the outputs from many neural networks, each receiving related features derived from an audio stream, such as individual frequency bands. After each neural network has estimated the subword posterior probabilities from the individual neural network's limited portion of the audio stream, these posterior probabilities are merged by means of another neural network into a single set of posterior probabilities, which are then transformed and de-correlated and supplied to an automatic speech recognition system. The automatic speech recognition system can be a hidden Markov model.

It is relatively easy to combine different features streams, such as those with different temporal properties or spectral selections, and provide such additional features analysis to existing GMM systems.

Other features and advantages will become apparent from the following description, including the drawings and the claims.

DETAILED DESCRIPTION

A large improvement may be obtained in word recognition performance by combining neural-net discriminative feature processing with Gaussian-mixture distribution modeling. By training the neural network to generate subword probability posteriors, then using transformations of these estimates as the base features for a conventionally-trained Gaussian-mixture based system, substantial error rate reductions may be achieved.

The present invention provides a means by which a non-Gaussian distribution of subword posterior probabilities may be utilized with a Gaussian distribution model automatic voice recognition system.

Figure 1:
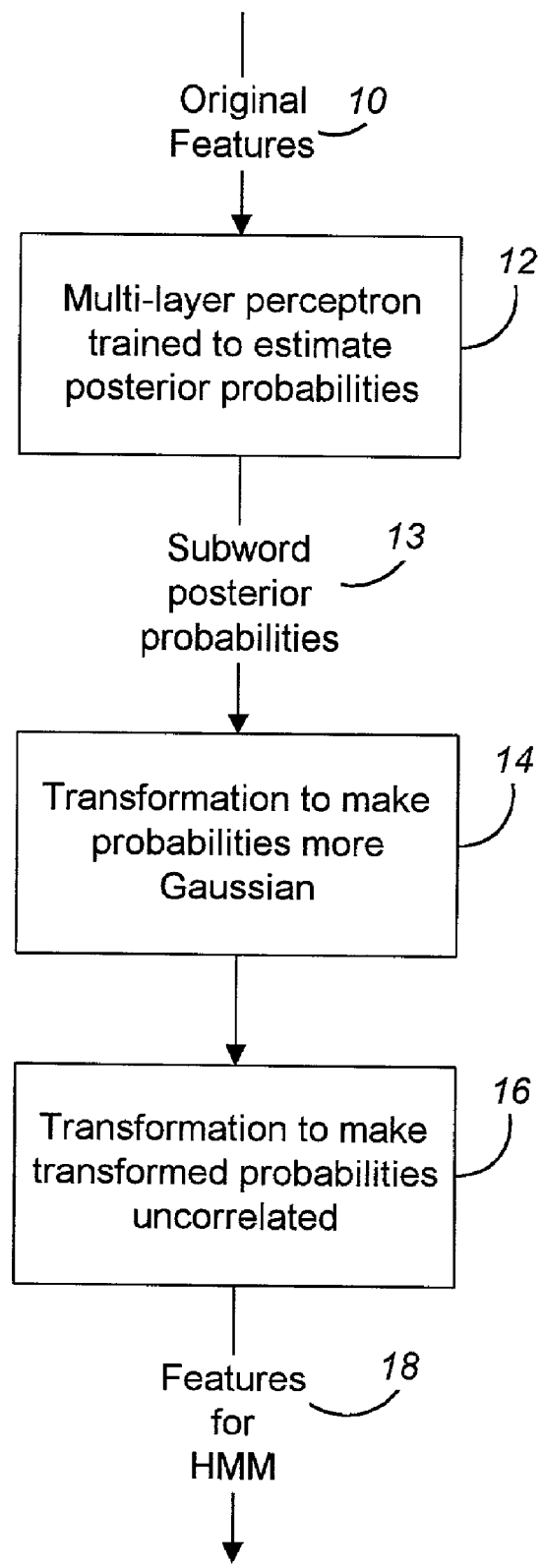
FIGS. 1, 2, and 3 are block diagrams showing the flow of data through systems made in accordance with the invention.

As shown in FIG. 1, original features 10 derived from an audio stream are input to a neural network such as a multi-layer perceptron (MLP) 12 phone classifier trained to estimate subword (phone) posterior probabilities. Training may be done with hand-labeled or automatically labeled data sets labeled for phone identity and timing. The original features 10 may be selected from a variety of frequency spectra, and may be temporally limited as well, including syllable-length or even longer periods, to provide temporal vectors of logarithmic energies to the input of the MLP 12.

The output 13 of the MLP 12 is subword posterior probabilities. This output is generally skewed with respect to a Gaussian distribution. A Gaussian distribution would be optimal for a Gaussian-mixture-based automatic speech recognition system. The subword posterior probabilities are therefore subject to a transformation 14 to make the probabilities more Gaussian, for instance by taking their logarithms. Alternatively, the final nonlinearity in the output layer of the neural network MLP 12 may be omitted. In one implementation, where a softmax nonlinearity (exponentials are normalized to sum to 1) is placed in the output layer position, skipping this layer it is very close to taking the log of the subsequent probabilities.

Having adjusted the distribution of the posterior probabilities to make it more nearly Gaussian, the probabilities are de-correlated by a de-correlation transformation 16. This de-correlation may be achieved by application of the Karhunen-Loeve projection. The resulting transformed (Gaussian) and de-correlated subword posterior probabilities (output features 18) are now optimized for use in a Gaussian-mixture model automatic voice recognition system, such as a hidden Markov model (HMM) system.

Figure 2:
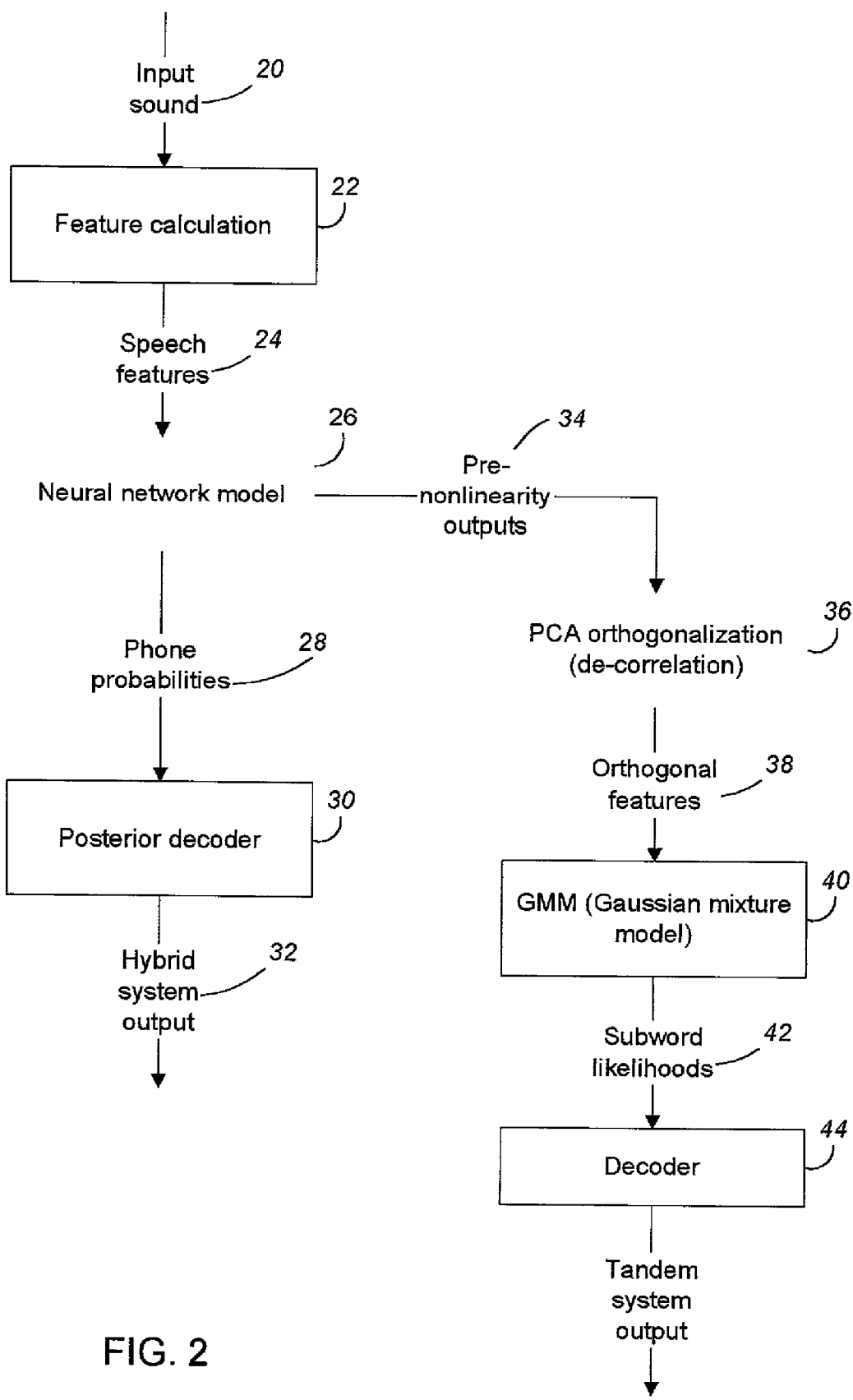

FIG. 2 illustrates a comparison of the existing hybrid type systems and the tandem system of the present invention. Common to both systems, input sound 20 is supplied to a feature extractor 22. Features may include short-term (less than 200 ms) spectral envelopes, longer-term (200 ms and greater) spectral envelopes, long-term (in the region of one second) spectral envelopes, and envelopes separated into critical band frequencies. Other feature sets may be used as well. The extracted speech features 24 are supplied to a neural net model 26 as described above.

In existing hybrid systems, the output of the neural net model 26 is provided to a posterior decoder 30 and the output 32 is analyzed for likely word content by the existing hybrid system analyzers.

In the present invention, however, the output 34 from the neural net 26 is taken before the nonlinearity layer is applied. The pre-nonlinearity output 34 therefore has a more Gaussian distribution than that of output 28. Alternatively, the logarithms of output 28 may be used. The output 34 is subject to a PCA (principal component analysis) orthogonalization 36 (such as the Karhunen-Loeve projection) where it is de-correlated 40 and supplied to a Gaussian-mixture model automatic speech recognition system, such as a hidden Markov model system. The result is in effect a tandem system—both neural net and Gaussian-mixture-model. This tandem system may provide substantial reductions in the error rate compared to hybrid or Gaussian-mixture model system alone. The neural nets may be trained to examine a variety of different features sets, adding the ability to provide an enhanced variety of features to the GMM system.

The features constituted by the log-posterior probabilities tend to contain one large value (corresponding to the current phone) with all other values much smaller. Application of the Karhunen-Loeve projection improves system performance, possibly by improving the match of these features to the Gaussian mixture models.

The Gaussian mixture model is preferably retrained with the new features. This may be done on the same training set as used to train the neural networks, but is preferably done by using a second set of utterances held out from the original training so as to make the features truly representative of the behavior of the neural network on unseen data. This may have the unwanted effect of reducing the training data available to each stage, however.

Figure 3:
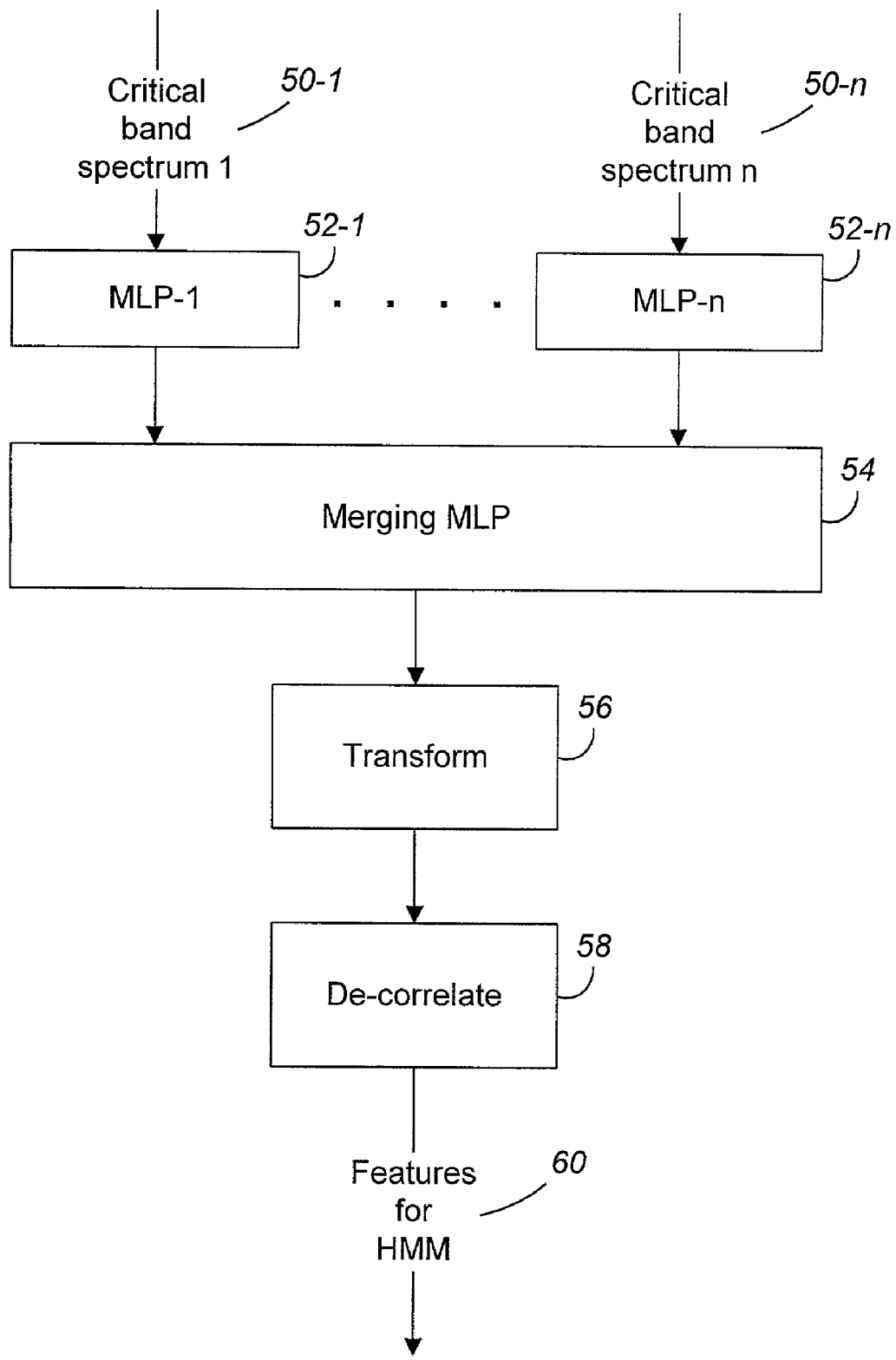

The invention permits the straightforward combination of multiple streams of features. By way of non-limiting example, FIG. 3 illustrates a method that combines separate spectral band posterior probabilities into a combined set of posterior probabilities. The speech input is separated into critical spectral bands and time sampled to provide n critical band spectrum inputs 50-1 to 50-$n$, each of which is input to a corresponding separate trained multi-layer perceptron (MLP) neural network 52-1 to 52-$n$, each of which estimates the subword posterior probability within the spectral band input to it. The separate sets of posterior probabilities are combined in a merging MLP 54 into a single merged set of posterior probabilities. The merged set of posterior probabilities is then transformed (transformer 56) and de-correlated (transformer 58) as described above. The output 60 is a set of features optimized for processing by a Gaussian-mixture model decoder, such as a hidden Markov model system.

Other features sets may be similarly used, such as different temporal selections.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Still other embodiments are within the scope of the claims. For example, different feature sets may be combined.

What is claimed is:

1. A method of combining neural-net discriminative feature processing with Gaussian-mixture distribution modeling in automatic speech recognition comprising:
    training at least one neural network to estimate a plurality of phone posterior probabilities from at least a portion of an audio stream containing speech;
    transforming the distribution of the plurality of posterior probabilities into a Gaussian distribution;
    de-correlating the transformed posterior probabilities; and
    applying the de-correlated and transformed posterior probabilities as features to a Gaussian mixture model automatic speech recognition system.

2. The method of claim 1 wherein the neural network is a multilayer perceptron based phone classifier.

3. The method of claim 1 wherein the at least a portion of an audio stream comprises at least one critical band of frequencies.

4. The method of claim 1 wherein the transforming comprises taking the logarithm of the posterior probabilities.

5. The method of claim 1 wherein the transforming comprises bypassing an output layer of the neural network wherein the output layer comprises softmax non-linearity.

6. The method of claim 1 wherein the de-correlating comprises application of a Karhunen-Loeve projection.

7. The method of claim 1 wherein the neural network is trained from phonetically hand labeled data.

8. The method of claim 1 in which the automatic speech recognition system comprises a hidden Markov model.

9. A computer program product, stored on a computer readable medium, comprising instructions operable to cause a programmable processor to:
    receive a plurality of subword posterior probabilities from at least one neural network trained to estimate subword posterior probabilities from at least a portion of an audio stream;
    transform a distribution of the plurality of posterior probabilities into a Gaussian distribution;
    de-correlate the transformed posterior probabilities; and
    supply the de-correlated and transformed posterior probabilities as features to a Gaussian mixture model speech recognition system.

10. The computer program product of claim 9 wherein the at least one neural network is a multilayer perceptron based phone classifier.

11. The computer program product of claim 9 wherein the at least a portion of an audio stream comprises at least one critical band of frequencies.

12. The computer program product of claim 9 wherein the transformation of the distribution comprises taking the logarithm of the posterior probabilities.

13. The computer program product of claim 9 wherein the transformation comprises bypassing an output layer of the neural network.

14. The computer program product of claim 9 wherein the de-correlation comprises application of a Karhunen-Loeve projection.

15. The computer program product of claim 9 wherein the neural network is trained from phonetically hand labeled data.

16. The computer program product of claim 9 wherein the automatic speech recognition system comprises a hidden Markov model.

17. A method of using neural-net discriminative feature processing with Gaussian-mixture distribution modeling for use in automatic speech recognition comprising:
    training a first plurality of neural networks to generate a set of pluralities of subword posterior probabilities from at least portions of an audio stream;
    non-linearly merging the set of pluralities of posterior probabilities into a merged plurality of posterior probabilities using a second neural network;
    transforming the distribution of the merged plurality of posterior probabilities into a Gaussian distribution;
    de-correlating the transformed merged plurality of posterior probabilities; and
    applying the de-correlated and transformed merged plurality of posterior probabilities as features to an automatic speech recognition system.

18. The method of claim 17 wherein the audio speech stream is separated into a plurality of frequency bands, and wherein each individual frequency band is provided as input to one of the plurality of neural networks.

19. The method of claim 17 wherein the input to the first plurality of neural networks comprises syllable length temporal vectors of logarithmic energies from the audio stream.

20. The method of claim 17 wherein the automatic speech recognition system comprises a hidden Markov model.

* * * * *